United States Patent
Kim (10) Patent No.: US 7,321,195 B2
(45) Date of Patent: Jan. 22, 2008

(54) ORGANIC ELECTRO-LUMINESCENT DEVICE HAVING POLYMER EMISSION LAYER

(75) Inventor: Jin Ook Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 154 days.

(21) Appl. No.: 10/694,838

(22) Filed: Oct. 29, 2003

(65) Prior Publication Data

US 2004/0085015 A1    May 6, 2004

(30) Foreign Application Priority Data

Nov. 6, 2002    (KR) .................... 10-2002-0068595

(51) Int. Cl.
*H05B 33/00*    (2006.01)
(52) U.S. Cl. .................... 313/504; 313/506; 428/917
(58) Field of Classification Search ............... 313/504, 313/506; 428/917
See application file for complete search history.

(56) References Cited

U.S. PATENT DOCUMENTS

| | | | |
|---|---|---|---|
| 6,007,928 A * | 12/1999 | Sakakibara et al. | 428/690 |
| 6,861,502 B1 * | 3/2005 | Towns et al. | 528/422 |
| 2001/0010367 A1 * | 8/2001 | Burnell-Jones | 252/301.36 |
| 2002/0055014 A1 * | 5/2002 | Okada et al. | 428/690 |
| 2003/0224205 A1 * | 12/2003 | Li et al. | 428/690 |
| 2004/0004433 A1 * | 1/2004 | Lamansky et al. | 313/506 |

FOREIGN PATENT DOCUMENTS

JP    2001-345182    12/2001

* cited by examiner

*Primary Examiner*—Ashok Patel
(74) *Attorney, Agent, or Firm*—Morgan, Lewis & Bockius LLP (57) ABSTRACT

An organic electro-luminescent device and a method for fabricating the same are disclosed in the present invention. The electro-luminescent device includes first and second electrodes over a substrate, and an organic emission layer between first and second electrodes, wherein the organic emission layer has a blended structure of a block copolymer and an organic emission material. The fabricating method includes forming a first electrode on a substrate, forming an organic emission layer over the first electrode, wherein the organic emission layer has a blended structure of a block copolymer and an organic emission material, and forming a second electrode over the organic emission layer.

13 Claims, 6 Drawing Sheets

ORGANIC ELECTRO-LUMINESCENT DEVICE HAVING POLYMER EMISSION LAYER

This application claims the benefit of the Korean Patent Application No. P2002-068595 filed on Nov. 6, 2002, which is hereby incorporated by reference.

BACKGROUND OF THE INVENTION

1. Field of the Invention

The present invention relates to a flat panel display device, and more particularly, to an organic electro-luminescent device having a polymer emission layer (EML) and a method for fabricating the same. Although the present invention is suitable for a wide scope of applications, it is particularly suitable for a uniform luminescence by forming the polymer emission layer by blending a block copolymer and an emission material.

2. Discussion of the Related Art

Recently, with the tendency for a large-sized display, there is an increasing demand for flat-panel display devices occupying less space. One of the flat-panel display devices is an organic electro-luminescent device (hereinafter, referred to as an "organic EL device"), and the technology for the electro-luminescent device has been rapidly developed. Several prototype products have already been demonstrated in the market.

The organic EL device includes an anode formed of a transparent material, such as indium tin oxide (ITO), a cathode formed of a metal (Ca, Li, Al:Li, Mg:Ag, and so on) having a low work function, and a thin organic layer formed between the anode and the cathode. If a forward voltage is applied to such an organic EL device, holes and electrons are injected from the anode and the cathode, respectively. The injected holes and electrons are combined with each other to form excitons. The exciton causes a radiative recombination, which is called the electro-luminescence phenomenon.

Herein, materials for the thin organic layer can be classified into a low molecular material or a high molecular material (i.e., a polymer). In the case of the low molecular material, the thin organic layer is formed on a substrate using a vapor deposition method. In the case of the polymer, it is formed on a substrate using a spin coating method. In order to operate the device at a low voltage, the thin organic layer is formed at a very thin thickness of about 1000 Å. The thin organic layer should be uniform and should not have defects, such as a pinhole.

Also, the thin organic layer is formed of a single material. However, it is generally formed as a multi-layer structure of several organic materials.

The reason for forming the organic device in a multi-layer structure is that the holes and the electrons can be effectively transported to an organic emission layer (EML) when using a hole transport layer (HTL) and an electron transport layer (ETL), since the mobility of the holes is greatly different from that of the electrons in the organic material. If a hole density and an electron density are balanced in the organic emission layer (EML), luminous efficiency is increased.

Additionally, in some cases, an energy barrier of the hole injection can be lowered if a hole injection layer (HIL) formed of a material, such as conductive polymer, Cu—PC or the like, is additionally formed between the anode and the hole transport layer. The energy barrier of the electron injection can be also lowered if a buffer layer (i.e., an electron injection layer), such as LiF layer having a thickness of about 5 to 10 Å, is additionally formed between the cathode and the electron transport layer, such that luminous efficiency is enhanced and a driving voltage is reduced.

If the thin organic layer is formed of a high molecular material (i.e., polymer), the hole injection layer (HIL) and the hole transport layer (HTL) are formed as a single layer and the electron transport layer (ETL) and the electron injection layer (EIL) are not formed.

In the organic EL device, an organic material for the thin organic layer inserted between both electrodes has an advantage in that various types of materials can be easily synthesized because of the simple synthesis path and the color tuning. The organic material is classified into a low molecular material and a high molecular material.

When the thin organic layer is formed of a low molecular material, a driving voltage is lowered and a thin layer having a thickness of about 100 nanometers (nm) is obtained. Also, it is possible to obtain a high resolution and reproduce a natural color. Meanwhile, when the thin organic layer is formed of a high molecular material, a thermal stability, a low driving voltage, and a flexible characteristic can be obtained, and a large-sized device can be manufactured at a low cost. Also, a polymer chain of one dimension is arranged to emit polarized light and an on-off speed is fast.

Thus, depending on organic materials, the organic EL devices can be classified into a low molecular organic EL device using a low molecular material, a high molecular organic EL device using a high molecular material, and a compound organic EL device using both of the low molecular material and the high molecular material. In general, each of these organic EL devices is formed of a multi-layer structure.

Figure 1:
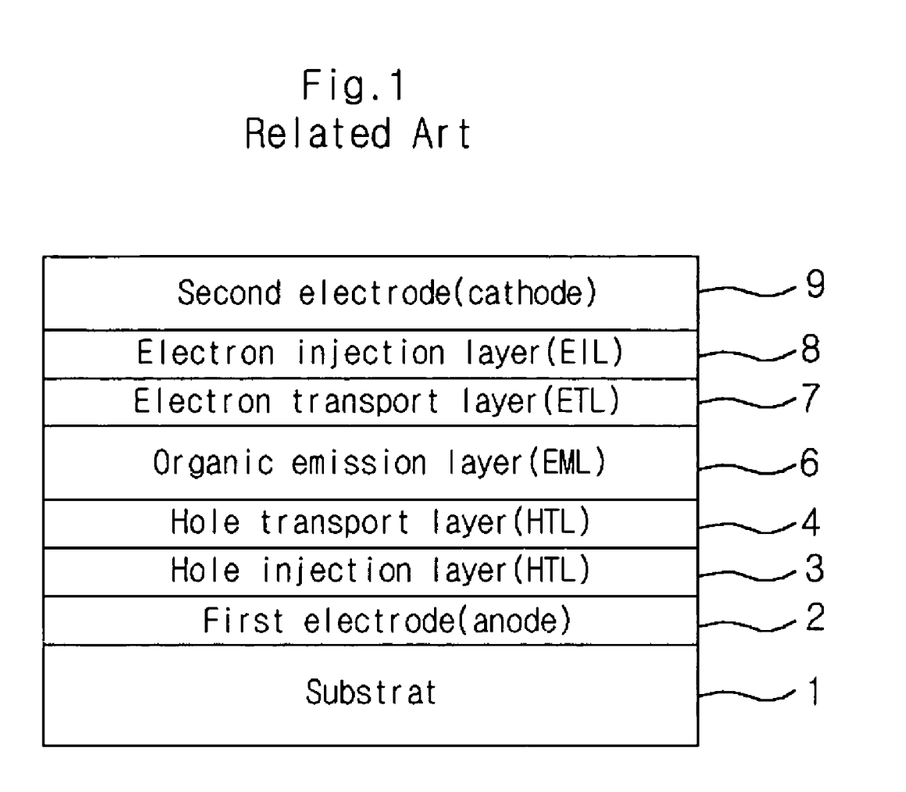
FIG. 1 is a cross-sectional view of an organic electro-luminescent device according to the related art.

FIG. 1 is a cross-sectional view of an organic electro-luminescent device according to the related art.

Referring to FIG. 1, the organic EL device according to the related art includes a substrate 1, a first electrode 2, a hole injection layer 3, a hole transport layer 4, an organic emission layer 6, an electron transport layer 7, an electron injection layer 8, and a second electrode 2.

Here, the second electrode 9 (i.e., cathode) is formed of a metal such as Ca, Mg, Al or the like having a low work function, and lowers the barrier formed between the second electrode 9 and the organic emission layer 6 to obtain a high current density in the electron injection. By obtaining a high current density, it is possible to increase a luminous efficiency of the EL device.

Meanwhile, the first electrode 2 (i.e., anode) is for the hole injection and is formed of a transparent metal oxide having a high work function, so that the emitting light is outputted outside the EL device. Indium tin oxide (ITO) is the most widely used hole injection electrode and has a thickness of approximately 30 nanometers (nm).

Also, the organic emission layer 6 is a material emitting light when holes and electrons injected respectively from the first electrode 2 and the second electrode 9 are combined to form excitons and the formed excitons drop to the ground state. The organic emission layer 6 is formed of a low molecular organic material, such as $Alq_3$, Anthracene or the like, or a high molecular organic material, such as PPV (poly(p-phenylenevinylene)), PT (polythiophene) or their derivatives.

In addition, the hole injection layer 3, the hole transport layer 4, the electron transport layer 7, and the electron injection layer 8 are interposed between the first electrode 2 and the organic emission layer 6 and between the second electrode 9 and the organic emission layer 6 so as to enhance the mobility of holes and electrons, respectively. The respective layers are formed of a low molecular organic material or a high molecular organic material, and their quantization efficiency is enhanced by a combination of the transport layers. The driving voltage of the respective layers is lowered by two steps of injection passing through the transport layer without a direct injection of carriers (electrons or holes). When the electrons and holes injected into the organic emission layer 6 are moved to the opposite electrode through the organic emission layer 6, they are blocked by the transport layer of the opposite side to control the recombination, thereby enhancing the luminous efficiency.

FIG. 1 is a schematic view for the structure of a low molecular organic EL device according to the related art and for a high molecular organic EL device, the hole transport layer 4, the electron transport layer 7, and the electron injection layer 8 are not formed therein.

Figure 2A:
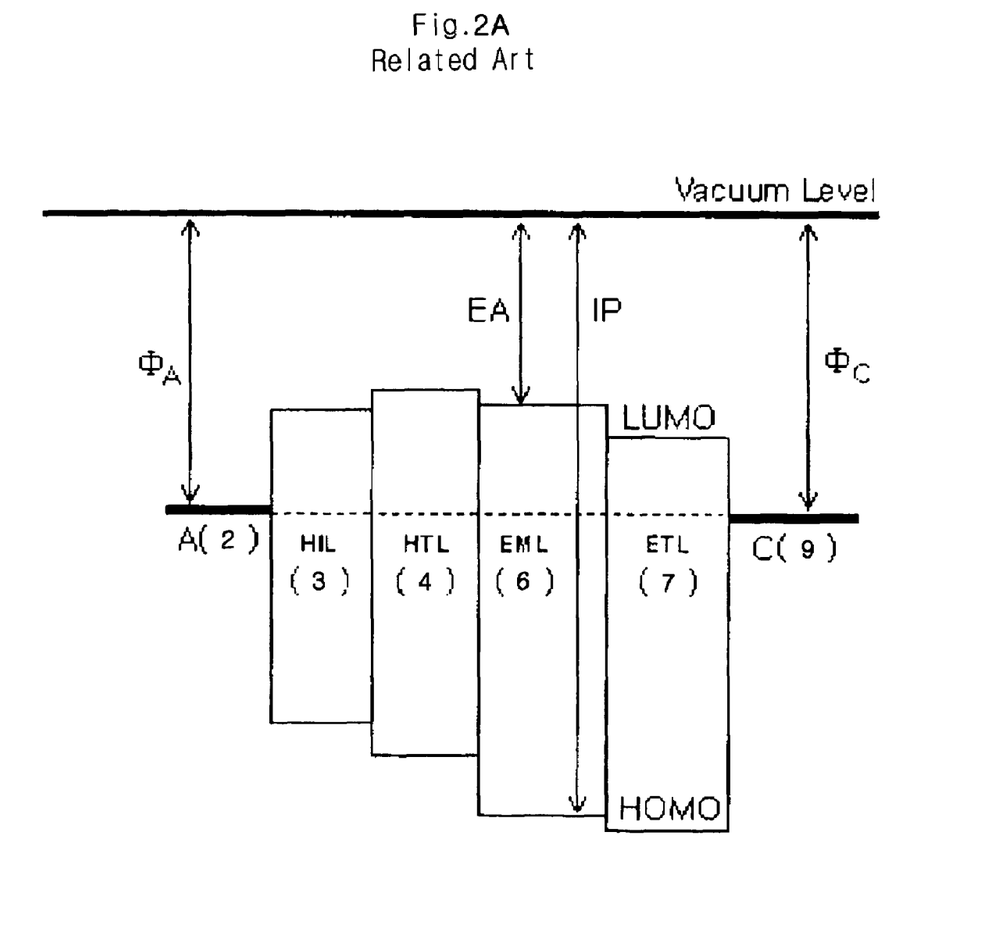
FIGS. 2A to 2C are energy diagrams of the organic electro-luminescent device according to the related art.
Figure 2B:
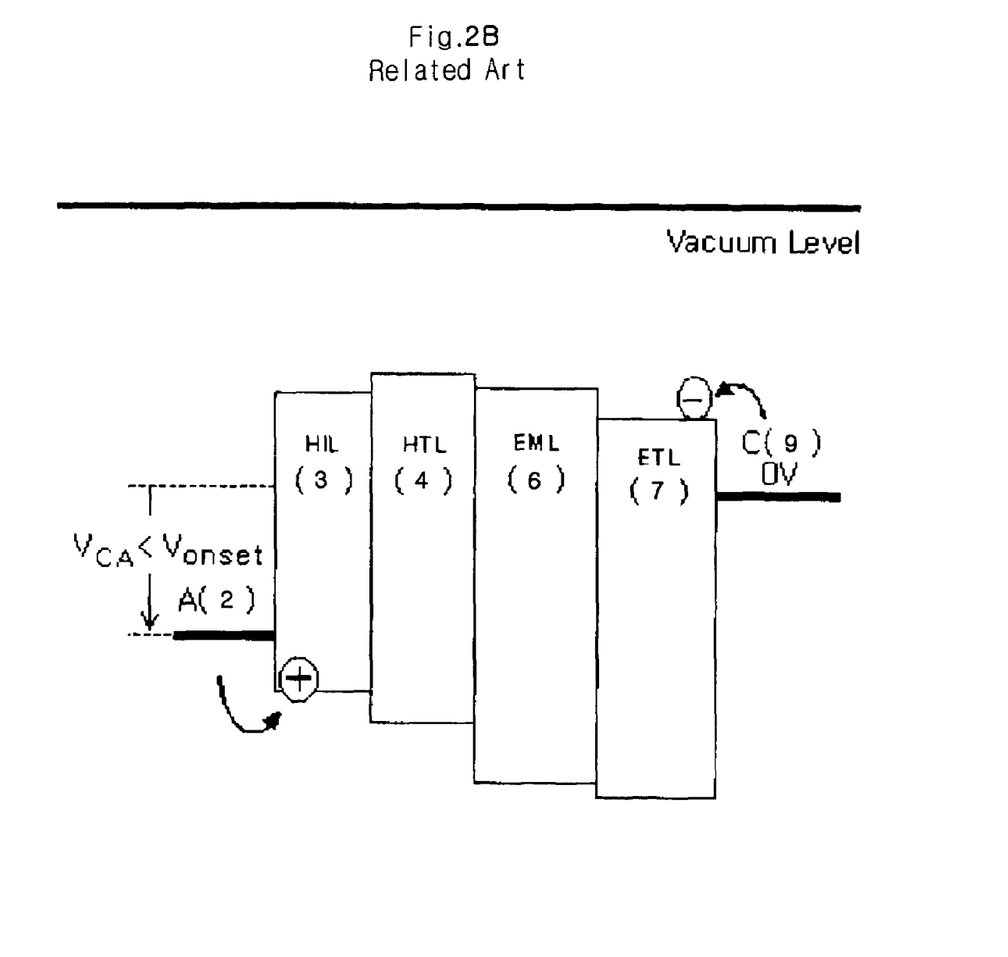
Figure 2C:
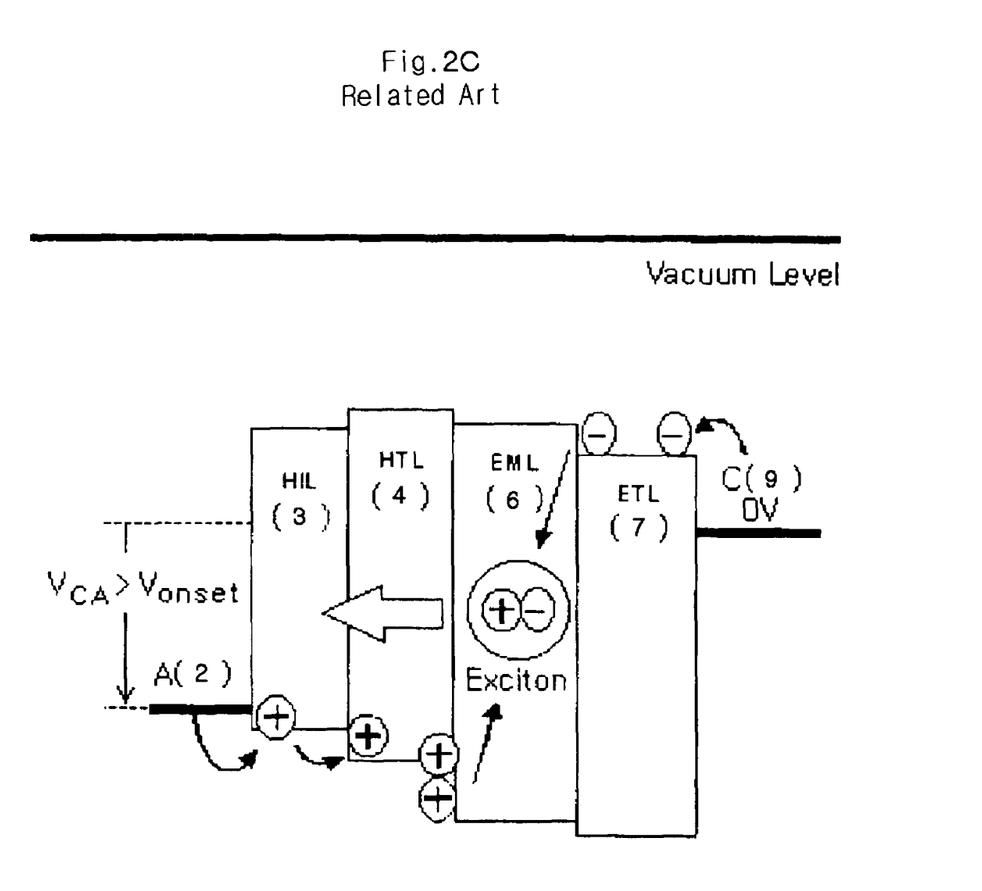

FIGS. 2A to 2C are energy diagrams of the organic electro-luminescent device according to the related art.

The luminescent principle of the related art organic EL device will be described with reference to FIGS. 2A to 2C. In the drawings, an electron is denoted by the symbol '−', a hole is denoted by the symbol of '+', and a movement of the electron or hole is denoted by an arrow. Also, $\phi_A$ and $\phi_C$ are indicative of work functions of the first electrode and the second electrode, respectively. EA and IP are electron affinity and ionization potential, respectively. HOMO and LOMO are indicative of the highest occupied molecular orbital (valence band) and the lowest unoccupied molecular orbital (conduction band), respectively.

First, as shown in FIG. 2A, if a potential ($V_{CA}$) is not applied between the first electrode 2 and the second electrode 9, the hole injection layer 3, the hole transport layer 4, the organic emission layer 6, and the electron transport layer 7 are in the thermodynamic equilibrium, so that the Fermi levels of the respective layers coincide with one another.

However, if the potential ($V_{CA}$) is applied between the first electrode 2 and the second electrode 9, holes are gradually injected into the HOMO of the hole injection layer 3 from the first electrode 2 and electrons are injected into the LUMO of the electron transport layer 7 from the second electrode 9 as shown in FIG. 2B. If the applied voltage ($V_{CA}$) is lower than a driving voltage or a turn-on voltage ($V_{onset}$), holes or electrons are not moved to the organic emission layer 6 and accordingly the electro-luminescence does not occur.

As a result, as shown in FIG. 2C, if the applied voltage ($V_{CA}$) is higher than the driving voltage ($V_{onset}$), holes or electrons pass through the hole injection layer 3, the hole transport layer 4, and the electron transport layer 7, and are injected into the organic emission layer 6, so that the holes and the electrons are recombined to cause the electro-luminescence.

FIGS. 2A to 2C are schematic views for the structure of a low molecular organic EL device according to the related art and in case of a high molecular organic EL device, the hole transport layer 4, the electron transport layer 7, and the electron injection layer 8 are not formed therein.

As described above, the organic emission layer is formed of a low molecular organic material or a high molecular organic material. In the high molecular emission layer using a high molecular organic material, a single high molecular emission layer (i.e., high molecular emission layer of one high molecular material) is used. However, in order to prevent an interchain interaction and enhance the performance of the EL device, researches on a blended system in which different kinds of high molecular materials are blended have been actively performed.

In other words, a dilution effect in which two kinds of luminescent materials are used or different kinds of materials are blended to maintain a distance between main luminescent materials is utilized. At this time, the distance between the main luminescent materials is maintained at about 10 micrometers (□).

Also, in patterning the high molecular emission layer using a laser induced thermal imaging (LITI) method, an inert polymer blend system is used to decrease the cohesion between the high molecular emission materials.

In an early research, PMMA (polymethylmethacrylate) has been used as the inert polymer. Recently, PS (polystyrene)-based material that can be miscible with the high molecular emission material is used as the inert polymer since a phase separation is generated between the PMMA and the polymer.

However, the forming method of the high molecular emission layer using the inert polymer has limitations in that the uniformity of the material used as an inert polymer and the uniform phase spreading between the high molecular emission layers blended with the inert polymer are not guaranteed.

SUMMARY OF THE INVENTION

Accordingly, the present invention is directed to an organic electro-luminescent device having a polymer emission layer and a method for fabricating the same that substantially obviate one or more of problems due to limitations and disadvantages of the related art.

Another object of the present invention is to provide an organic electro-luminescent device having a polymer emission layer and a method for fabricating the same formed by a blending block copolymer and an emission material to cause a uniform luminescence.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an organic electro-luminescent device includes first and second electrodes over a substrate, and an organic emission layer between the first and second electrodes, wherein the organic emission layer has a blended structure of a block copolymer and an organic emission material.

The block copolymer is formed by anionic polymerization and has at least two monomers. The block copolymer also has a periodic structure of one of a lamella structure, a cylindrical structure, and a spherical structure. Herein, the periodic structure varies with a ratio of the two different monomers.

Herein, the block copolymer also has a net structure.

In another aspect of the present invention, a method of fabricating an electro-luminescent device includes forming a first electrode on a substrate, forming an organic emission layer over the first electrode, wherein the organic emission layer has a blended structure of a block copolymer and an organic emission material, and forming a second electrode over the organic emission layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention forms an organic polymer emission layer by blending an organic polymer emission material, such as PPV (poly(p-phenylenevinylene)), PT (polythiophene) with a block copolymer.

The block copolymer serves as a matrix of the organic polymer emission material, and hinders an interchain interaction between the organic polymer emission materials to maintain an emission stability of the organic polymer emission layer.

In general, the block copolymer is formed by anionic polymerization. A basic structure of the block copolymer may be formed using two kinds of monomers of A and B. For instance, copolymers of AAAAAABBBBBB (diblock copolymer), AAAABBBBAAAA, BBBBAAAABBBB (triblock copolymer) or the like can be designed.

The block copolymers have periodic structures of a lamella structure, a cylindrical structure, a spherical structure, and the like, depending on the fractions of A and B.

In the above, the anionic polymerization is one of ionic polymerizations initiated by an anion. In the anionic polymerization, a carbon anion is an active point of the polymerization. A molecular amount of a polymer synthesized by an anion can be controlled well. Also, since the polymer synthesized by an anion has a narrow distribution of the molecular amount and an anion growth chain that is not readily destroyed, the block copolymer mentioned as above can be formed.

Figure 3:
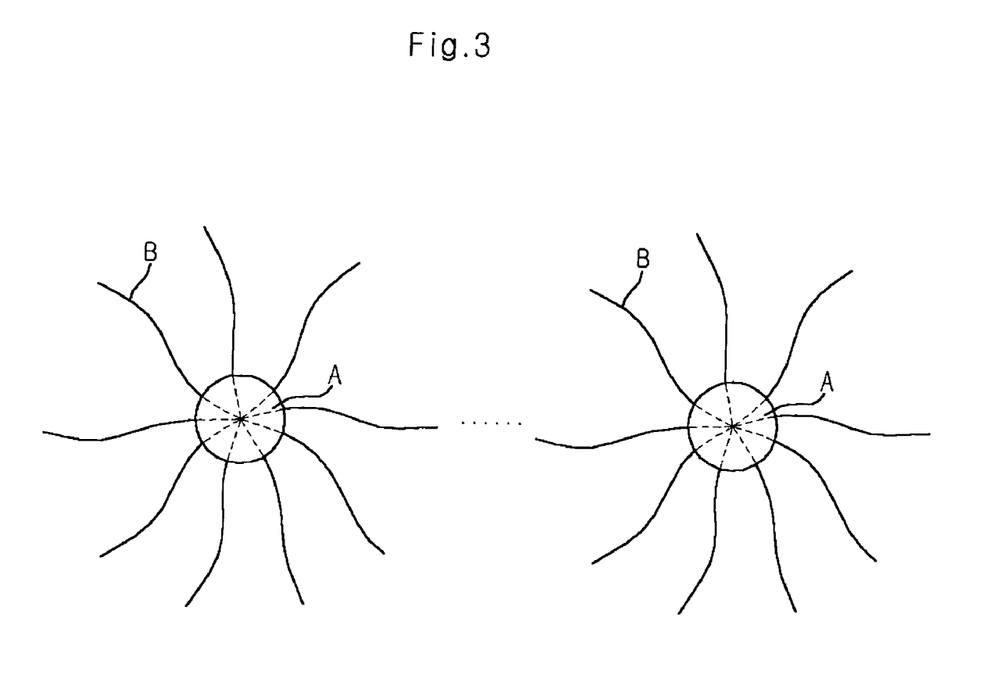
FIG. 3 is a schematic view of a block copolymer.

FIG. 3 is a schematic view of a block copolymer and corresponds to a conceptual view of the spherical structure that is one of BAB type polymer morphologies.

Referring to FIG. 3, the block copolymer has two kinds of monomers (A and B) and is in a spherical structure in which a fraction of B to A is 8:2.

If the fraction of monomer B to monomer A is 5:5, the block copolymer forms a lamella structure. Also, if the fraction of monomer B to monomer A is 6:4, the block copolymer forms a cylindrical structure.

Moreover, the block copolymer has a structure crosslinked by the two kinds of monomers A and B. This is because the monomers A and B are immiscible. In other words, although a phase separation is generated between the monomers A and B, a chemical bond still exists between the polymer chains of each monomer. Herein, in FIG. 3, a solid line denotes monomer B and a dotted line denotes monomer A.

As shown in FIG. 3, the block copolymer has a regular net structure, and shows a tendency that the organic polymer emission material is spread in the uniform net by blending the block copolymer serving as a net with the organic polymer emission material that is miscible with the block copolymer and performing a heat treatment of the blended materials.

A proper temperature for the above heat treatment is over the glass transition temperature (Tg) of each of the blended materials. All the polymers are a thermoplastic material.

Here, the distance between block A and block B is determined by the radius of the polymer chain and is nothing but a few ten nanometers (nm). Accordingly, an emission of organic polymer material spread between the blocks A and B is not problematic at all with respect to the display.

For example, the two kinds of monomers A and B may include the block copolymer are polybutadiene and polystyrene, respectively.

In other words, in the organic emission layer of the invention formed by anionic polymerization, the block copolymer becomes a polybutadiene-based block copolymer.

As a result, the block copolymer serves as a matrix of the organic polymer emission material, and it prevents an interchain interaction between the organic polymer emission materials to maintain the emission stability of the organic polymer emission layer.

Also, in blending the block copolymer and the organic emission material, although the organic emission material is a low polymerized organic emission material, it can be blended with the block copolymer as aforementioned.

Figure 4A:
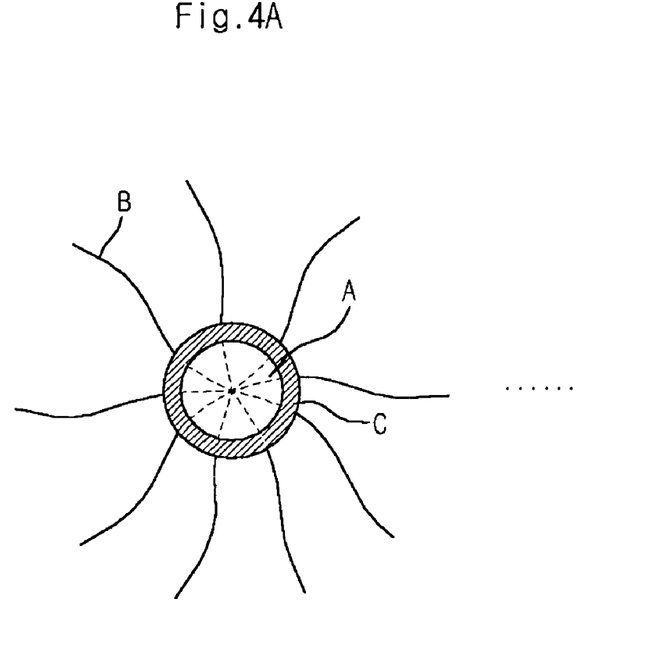
FIGS. 4A and 4B are schematic views showing blending states of the block copolymer and the organic emission material depending on a spreading coefficient according to the present invention.
Figure 4B:
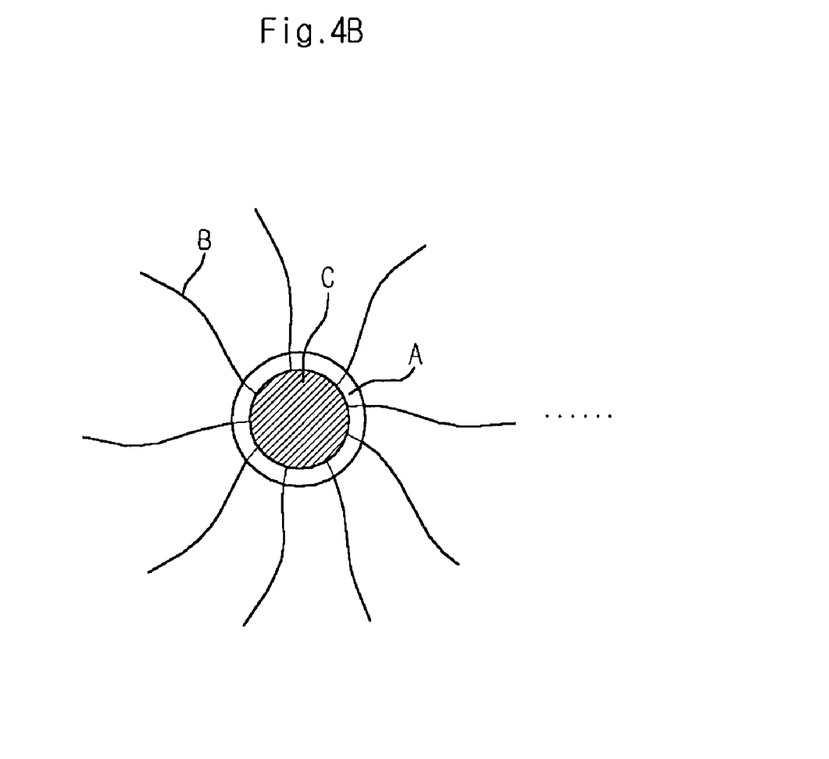

FIGS. 4A and 4B are schematic views showing blending states of the block copolymer and the organic emission material depending on a spreading coefficient according to the present invention.

As aforementioned, the organic emission layer of an organic EL device according to the present invention is formed by blending the organic polymer emission material such as PPV (poly(p-phenylenevinylene)), PT (polythiophene) with the block copolymer. The spreading type of the polymer emission material is varied depending on the spreading coefficient between the monomer constituting the block copolymer and the organic polymer emission material.

Referring back to FIG. 3, the block copolymer has a structure that the monomer B is widely expanded in a net structure, and the monomer A corresponds to the vertex of the net.

Here, when it is assumed that the organic polymer emission material is C, the spreading coefficient between monomer A and the organic polymer emission material C can be obtained from the interfacial tension of the monomer A having a dissimilar phase spread in the phase of the monomer B and the organic emission material C.

In other words, when it is assumed that $\lambda_{AB}$ is a spreading coefficient of A to B and $\gamma_{IJ}$ is an interfacial tension between I and J, a spreading coefficient of C to A can be obtained from $\lambda_{CA} = \gamma_{AB} - \gamma_{CB} - \gamma_{AC}$ and a spreading coefficient of A to C can be obtained from $\lambda_{AC} = \gamma_{CB} - \gamma_{AB} - \gamma_{CA}$.

FIG. 4A is a schematic view showing a blending state between the block copolymer and the organic polymer emission material when the spreading coefficient of C to A is greater than 0.

In other words, when $\lambda_{CA}>0$, the blending state in which the organic polymer emission material C is spread around the monomer A is formed as shown in FIG. 4A.

On the contrary, FIG. 4B is a schematic view showing a blending state between the block copolymer and the organic polymer emission material when the spreading coefficient of A to C is greater than 0.

Finally, when $\lambda_{CA}>0$ or $\lambda_{AC}>0$, the organic polymer emission material is blended with the block copolymer, thereby obtaining the aforementioned effect.

As described previously, according to the organic electro-luminescent device of the present invention, a polymer emission layer formed by blending block copolymer and polymer emission material is introduced into the organic EL device to prevent the interchain interaction between the polymer emission materials and provide a uniform luminescence, so that the luminescent stability of the polymer emission layer is maintained. As a result, the device performance is improved and the life span of the device is extended.

It will be apparent to those skilled in the art that various modifications and variations can be made in the organic electro-luminescent device having a polymer emission layer and the method for fabricating the same of the present invention without departing from the spirit or scope of the inventions. Thus, it is intended that the present invention covers the modifications and variations of this invention provided they come within the scope of the appended claims and their equivalents.

What is claimed is:

1. An organic electro-luminescent device, comprising:
   first and second electrodes over a substrate; and
   an organic emission layer between the first and second electrodes, wherein the organic emission layer has a blended structure, the blended structure including a block copolymer and an organic emission material, wherein the organic emission material is a polymer emission material.

2. The organic electro-luminescent device of claim 1, wherein the block copolymer is formed by anionic polymerization and has at least two monomers.

3. The organic electro-luminescent device of claim 2, wherein the at least two monomers include polystyrene and polybutadiene.

4. The organic electro-luminescent device of claim 2, wherein the block copolymer has a periodic structure of one of a lamella structure, a cylindrical structure, and a spherical structure.

5. The organic electro-luminescent device of claim 4, wherein the periodic structure varies with a ratio of the two different monomers.

6. The organic electro-luminescent device of claim 2, wherein the block copolymer has a net structure.

7. The organic electro-luminescent device of claim 6, wherein the at least two monomers are located at a vertex portion of the net structure and a portion other than the vertex portion in the net structure.

8. The organic electro-luminescent device of claim 1, wherein the organic emission layer has a different structure depending on a spreading coefficient between monomers constituting the block copolymer and the organic emission material.

9. The organic electro-luminescent device of claim 8, wherein the organic emission material is distributed around the monomers in the blended structure when the spreading coefficient of the monomer to the organic emission material is greater than 0.

10. The organic electro-luminescent device of claim 9, wherein the monomers are located at the vertex portion of a net structure.

11. The organic electro-luminescent device of claim 8, wherein the monomers are distributed around the organic emission material in the blended structure when the spreading coefficient of the organic emission material to the monomer is greater than 0.

12. The organic electro-luminescent device of claim 11, wherein the monomers are located at the vertex portion of the net structure.

13. An organic electro-luminescent device, comprising:
    first and second electrodes over a substrate; and
    an organic emission layer between the first and second electrodes, wherein the organic emission layer has a blended structure, the blended structure including a block copolymer and an organic emission material, wherein the block copolymer has at least two monomers and the organic emission material is a polymer emission material.

* * * * *